United States Patent [19]

Cutkosky et al.

[11] Patent Number: 4,545,722
[45] Date of Patent: Oct. 8, 1985

[54] FLEXIBLE ROBOT GRIPPER FOR IRREGULAR SHAPES

[75] Inventors: Mark R. Cutkosky; Eiki Kurokawa, both of Pittsburgh, Pa.

[73] Assignee: Westinghouse Electric Corp., Pittsburgh, Pa.

[21] Appl. No.: 491,479

[22] Filed: May 4, 1983

[51] Int. Cl.[4] .............................................. B66C 1/00
[52] U.S. Cl. ..................................... 414/730; 901/37; 294/104
[58] Field of Search ........................ 901/36, 37, 34, 39, 901/31, 33; 294/115, 104, 118, 119, 81 R; 414/739, 740, 729, 730, 753, 917

[56] References Cited

U.S. PATENT DOCUMENTS 3,272,347  1/1963  Lemelson ........................... 901/32 X
3,630,391  12/1971 Wilson ................................ 901/37 X
3,697,118  10/1972 Johnstone et al. ............... 294/119 X
4,291,909  9/1981  Coatantiec ........................ 414/753 X

FOREIGN PATENT DOCUMENTS 1156622  2/1969  United Kingdom ................ 414/740
841962   5/1981  U.S.S.R. ............................... 901/34

Primary Examiner—Robert J. Spar
Assistant Examiner—Dennis Williamson
Attorney, Agent, or Firm—Thomas R. Trempus

[57] ABSTRACT

The invention is a flexible gripper for industrial robots and the like through the use of articulated ball joint linkages and an industrial brake. The gripper can orient itself to an object and adapt to irregular surfaces while engaging the object. In other words, the gripper matches the orientation of the grasped part. With the object so engaged, the gripper is locked rigidly so that the orientation of the part is preserved as it is manipulated by the flexible gripper and its associated robot.

13 Claims, 7 Drawing Figures

FLEXIBLE ROBOT GRIPPER FOR IRREGULAR SHAPES

BACKGROUND OF THE INVENTION

The invention is related to industrial manipulators and the like and is particularly directed to an end-effector design which accommodates tapered, twisted shapes.

The introduction of robotics into the manufacturing facility has resulted in demand for a variety of end-effectors, that is gripper-like devices which manipulate tools or components in the manufacturing process. The specific application of the end-effector to a given manufacturing process can require a multi-jointed, complex design which provides several degrees of freedom. The dexterity of the end-effector and the industrial manipulator is reflected in directional movement capabilities which are indicated as degrees of freedom.

The complexity of the task, the shape and size of the object to be manipulated and the environment in which the end-effector must function are only several of the factors considered in the design of an end-effector. The present invention provides an end effector for manipulating objects having an irregular shape. It has been known that irregularly shaped objects can be manipulated with a gripper device having an air bladder built into the fingers. The air bladder inflates upon the fingers gripping the object to insure uniform holding forces throughout the gripper. "Robots and Remote Handling for Radioactive Materials"; Sheldon, O. L., et al., 2nd International Symposium On Industrial Robots, Tokyo Institute of Technology, Tokyo, Japan. It has also been known to provide a gripper composed of small segments interconnected by wires which form the gripper to the object. These systems typically involve intricate pulley systems driven by electric motors. "The Development of the Soft Gripper for the Versatile Robot Hand", Hirose, Sheiyso, et al; 7th International Symposium on Industrial Robots, Tokyo Institute of Technology; Tokyo, Japan.

It is therefore an object of this invention to provide an end-effector, or robot hand, which automatically adapts itself to the orientation of the object to be manipulated and preserves the orientation of the object as it is transported from one work station to another.

It is also an object of this invention to provide an end-effector having multiple degrees of freedom which permit the end-effector to conform to irregular shapes and to provide an end-effector with braking means to stabilize the end-effector after object acquisition.

SUMMARY OF THE INVENTION

The present invention is an end-effector in which a structured frame member has a mounting means at one end thereof for the attachment thereof to an industrial manipulator, robot or the like. The other end of the frame includes a fixed axis about which a first and second gripper means are rotatably mounted. Actuating means is operably associated with the first and second gripper means to effect the rotational movement thereof about the fixed axis. Brake means are operably associated with the first gripper means to selectively restrict the rotational movement of the gripper about the fixed axis. When the brake means is not engaged, the actuating means effects the rotation of both the first and second gripper means relative to the fixed xis and frame member. When the brake means is engaged so that the first gripper means is locked in a selected position, the actuating means now effects only the rotational movement of the second gripper means relative to the fixed axis. Additionally, the second gripper means consists of two arms which are connected and driven by a linkage which permits an additional degree of freedom through the independent rotational movement of each arm about the fixed axis. Although these arms are capable of independent movement, both are driven by the actuating means.

BRIEF DESCRIPTION OF THE DRAWINGS

The above as well as other features and advantages of the invention will become apparent through consideration of the detailed description in connection with the accompanying drawings in which.

DETAILED DESCRIPTION OF THE INVENTION

The end-effector of this invention functions as a gripper for irregular shapes. More particularly, this end-effector is designed to be mounted on a standard industrial manipulator and to grasp heavy and irregular shapes such as preforms for turbine blade forgings and the like. By way of example, forging preforms are heavy and extremely irregular in shape and can be from 10 inches to several feet in length. Preforms have a roughly rectangular cross-section which varies in dimension and orientation along its length. The present end-effector has demonstrated a capacity to firmly grasp these irregularly shaped forging preforms and to accurately transport them from one location to another.

Figure 1:
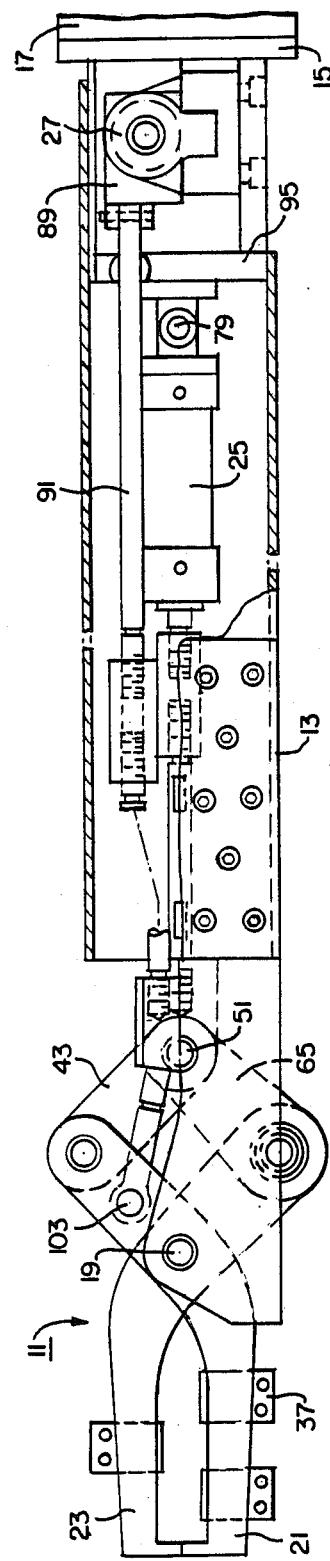
FIG. 1 is a side elevational, sectional view of an end-effector with portions cut away according to the teachings of this invention.
Figure 2:
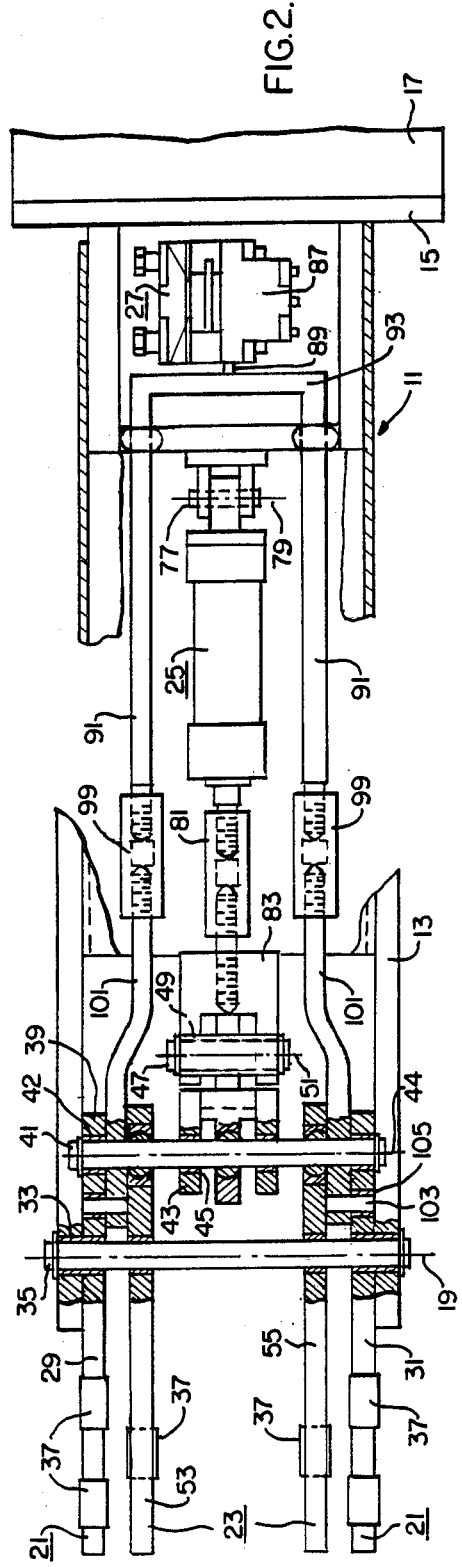
FIG. 2 is a top plan, sectional view of the present end-effector.
Figure 3:
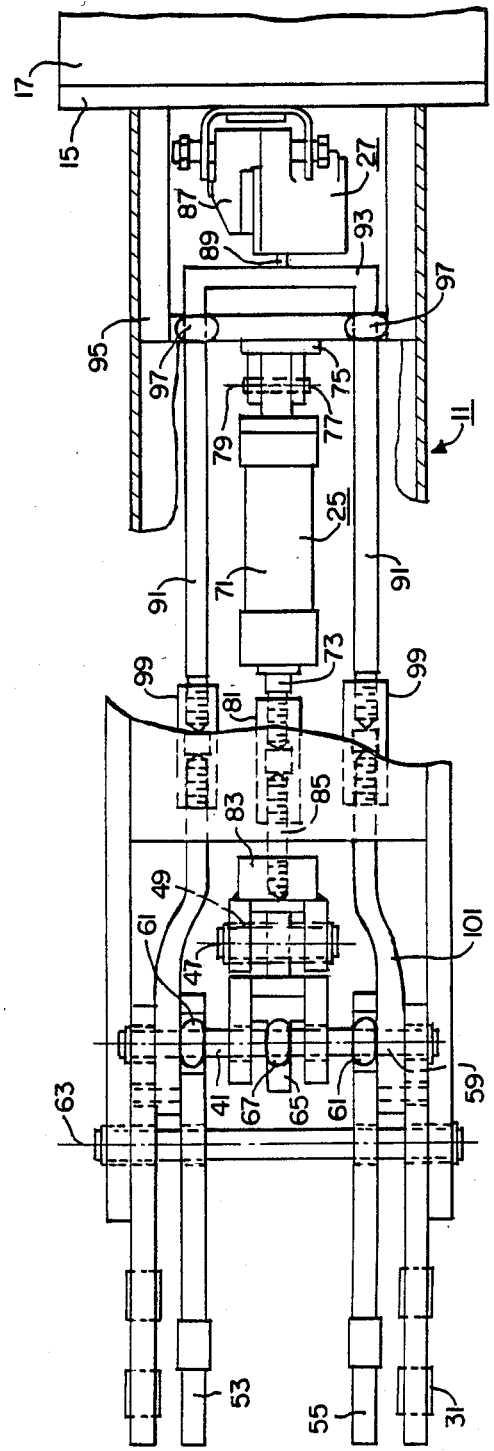
FIG. 3 is a bottom plan, sectional view of the present end-effector.

Considering FIGS. 1, 2 and 3, an end-effector for gripping irregular shapes, generally indicated by the reference character 11, is shown in side elevational and top and bottom plan views, respectively. The end effector 11 includes a structural frame member 13 which has at one end thereof a mounting plate means 15 for establishing a mechanical interface between the gripper and a conventional industrial manipulator schematically illustrated at 17. The frame member 13 provides a first axis 19 about which first gripper means 21 and second gripper means 23 can rotate both in unison with respect to the frame member 13 and independently of each other. Both the first and second gripper means, 21 and 23 respectively, are actuated by a single actuating means 25 which is pivotally mounted on the frame member 13. Brake means 27 are operably associated with the first gripper means 21 for restricting the pivotal movement thereof about the first axis 19. With the first gripper means 21 so restricted, the actuating means 25 now effects only the pivotal movement of the second gripper means 23 about the first axis 19. The fact that both the first and second gripper means are pivotable provides multiple degrees of freedom which permit the gripper's to settle independently against the twisted and uneven shapes of the preforms. Moreover, the brake means which restricts finger movement, eliminates a degree of freedom that preserves the original orientation of the preform during relocation by the industrial manipulator.

Having generally described the major components of the end-effector 11, the following discussion in conjunction with FIGS. 1 through 3 will provide a detailed analysis of the end-effector and its operation. The first gripper means 21 includes a pair of arms 29 and 31 rotatably mounted by means of bushings 33 or the like on a support shaft 35 which defines the first fixed axis 19. The portion of each arm 29 and 31 extending from the shaft 35 actually contacts the preform and may include gripping palms 37 thereon to protect the arms from excessive wear, corrosion or damage from a high temperature preform or the like. Such palms 37 are removably secured to the arm in a manner which facilitates ease of replacement. A further portion of each arm 29 and 31, as at 39, extends from the shaft 35 generally opposite the gripping portion thereof. A shaft 41, mounted in bushings 42 or the like defines a first floating axis. While the shaft 41 is rotatable relative to the arms 29 and 31, the shaft 41 also functions to inhibit independent rotational movement of the arms 29 and 31 relative to each other. A yoke like upper link 43 is rotatably mounted at one end on the shaft 41 by bushings 45 or the like while at the other end, the upper link 43 is rotatably mounted on shaft 47 by bushing 49 or the like. Shaft 47 defines a movable axis 51 which is operably associated with the actuating means 25 as will be hereinafter fully explained.

The second gripper means 23 includes a pair of arms 53 and 55 rotatably mounted by means of bushings 57 or the like on the support shaft 35 which defines the first fixed axis 19. The portion of each arm 53 and 55 which contacts the preform may include gripping palms 37. A further portion of each arm 53 and 55 extends from the shaft 35 in a generally, downward direction relative the corresponding portion of the arms 29 and 31 of the first gripper means 21. It will be noticed that the first and second gripper means 21 and 23 function in a pliers-like fashion about the first axis 19. A shaft 59 extending between the arms 53 and 55 is mounted in each arm by means of a spherical bearing 61 and defines a second floating axis 63. A lower link 65 is centrally disposed by means of a spherical bearing 67 on the shaft 59 and is in communication with shaft 47 by means of bushing 69. The spherical bearing ball-joint linkage allows the arms 53 and 55 to settle independently against the twisted and uneven shapes of the preforms. Thus the second floating axis 63 experiences gross movement in a generally vertical direction relative to the first fixed axis 19 and a twisting moment about the centrally disposed spherical bearing 67. It is the twisting moment which accommodates the independent movement of the arms 53 and 55.

The actuating means 25 includes a hydraulic cylinder 71 mounted onto the frame member 13 by means of a bracket 75 and pin 77. The pin 77 defines a second fixed pivot point 79 on the frame member and permits rotational movement of the cylinder 71. The first and second fixed pivot points 19 and 79 respectively permit rotation of the components associated therewith in the same plane. The fluid conduits, valves, controls and the like are of conventional design and known to those skilled in the art. Accordingly, these components are not illustrated herein. The cylinder 71 includes a piston 73 which is threadedly attached to a connecting block 81. As previously described, the first and second gripper means 21 and 23 are operably associated with the movable axis 51 of shaft 47. The shaft 47 is mounted by bushings 49 in a connecting link 83 from which a shaft 85 extends toward and is threadedly associated with, the connecting block 81.

The brake means 27 is operably associated with the first finger means 21 to restrict the rotational movement of the arms 29 and 31 about the first fixed axis 19. Generally, an industrial disc brake 87 is mounted on the frame member 13 at a point where it is protected from the heat of the preforms. The disc brake 87 clamps a thin sheet of carbon steel 89 which is connected by the pair of elongated rods 91 to the arms 29 and 31 of the first gripper means 21. The rods 91 are connected at one end to a cross-member 93 which supports the sheet of carbon steel 89. The rods extend through, and are movably supported in a structural wall 95 of the frame member 13 by means of spherical bearings 97. At their other end, each rod is threadedly connected to a connecting block 99. A brake rod link 101, threadedly connected to each connecting block 99 completes the mechanical linkage between the disc brake 89 and the first finger means 21. The brake rod links 101 are rotatably attached to the arms 29 and 31 by means of pins 103 and bushings 105. The pins 103 and spherical bearings 97 permit the vertical displacement of the brakes mechanical linkage, i.e. rods 92, as the first finger means rotate about the first fixed axis 19. The connecting blocks 99 of the brake means as well as the connecting block 81 associated with the actuating means 25 permit the longitudinal adjustment of their associated linkages. While a dual brake linkage operably associated with both arms of the first gripper means is shown, a single linkage configuration can be utilized. The choice of a single or dual linkage system is made in view of the desired load handling capacity and stability characteristics of the end-effector.

The operational advantages obtained from the end-effector of this invention are schematically illustrated in FIGS. 4 through 7 which show the present end-effector orienting itself with and engaging an irregularly shaped preform 111. The adapatability of this end-effector 11 and the degrees of freedom provided therein are described with reference to the first fixed axis 19 and the second fixed axis 79 of frame member 13 (not shown in these schematical representations). The first gripper means 21 and the second gripper means 23 are rotatably mounted at the first fixed axis 19 and the actuating means 25 is rotatable about the second fixed axis 79. The actuating means 25 is operably associated with the gripper means 21 and 23 at the movable or floating axis 51. Also schematically represented is the brake means 27 which is operably associated with the first gripper means 21.

Figure 4:
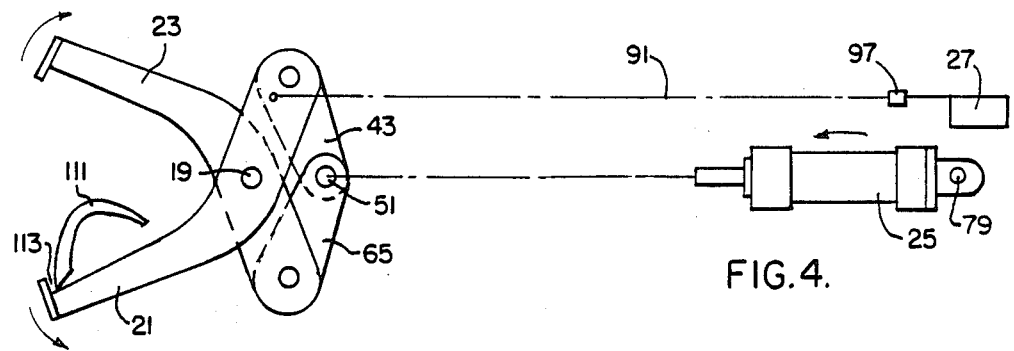
FIGS. 4 through 6 are schematical, side-elevational representations of the present end-effector orienting itself with, and gaining acquisition of, an irregularly shaped object.

In FIG. 4 the end-effector 11 is shown in an orientation condition as it approaches the preform 111. The actuating means 25 has extended its piston and linkage, moving the floating axis 51 toward the first fixed axis 19 in general alignment with the end-effector longitudinal axis defined by the first and second fixed axis 19 and 79. As a result the jaw-like first and second gripper means 21 and 23 rotate about the axis 19 into an open position. When the end-effector first contacts the preform as at 113, it may be the case as shown herein, that additional gross orientation of the end-effector is necessary in order for the first gripper means 21 to seat against the bottom of the preform.

Figure 5:
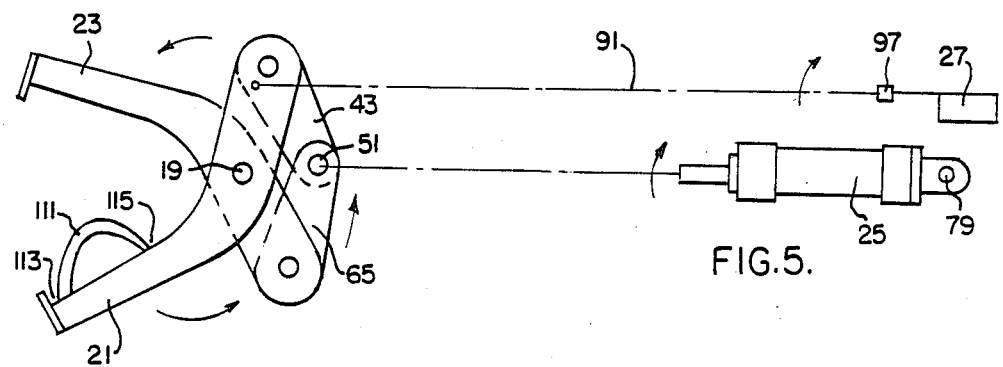
Figure 6:
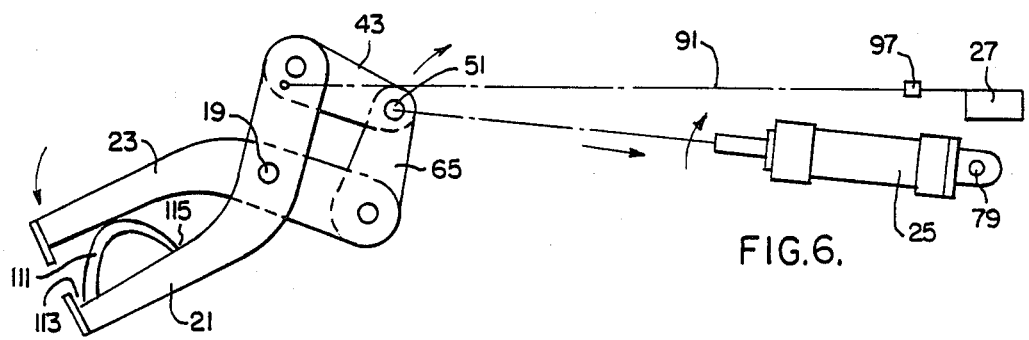

In FIG. 5, the gross orientation of the gripper means is possible because the actuating means is rotatably mounted on the second fixed axis 79. Additionally, the floating axis 51 is vertically displacable relative to the longitudinal axis of the end-effector. As the first gripper means 21 contacts the preform 111, it rotates about the first fixed axis 19 until a good seat is obtained as at 113 and 115. The gross downwardly rotational movement of both gripper means 21 and 23 is facilitated by the links 43 and 69 which connect the gripper means to the floating axis 51 which is vertically displaced and in turn causes the actuating means 25 to rotate in an upwardly direction. The brake means 27 is also subjected to some vertical displacement which is facilitated by the spherical bearings 97.

With the first gripper means 21 seated against the preform, the brake means 27 is engaged, locking the first gripper means 21 in a fixed position relative to the first fixed axis 19. The brake means 21 thus eliminates a degree of freedom of the end-effector's movement. The actuating means 25 draws the floating axis 51 generally backwardly and upwardly relative to the first fixed axis 19 causing the second gripper means 23 to close down against the preform 111.

Figure 7:
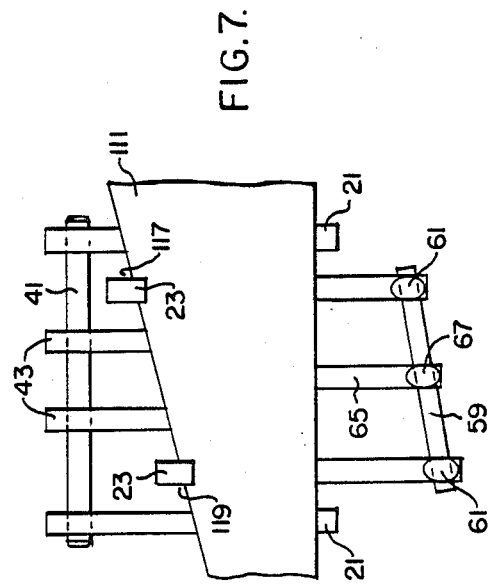
FIG. 7 is a schematical front elevational view of the present end effector, illustrating the additional degree of freedom provided to a gripping means, all according to the teachings of this invention.

The second gripper means 23 may also have to accommodate a tapered, twisted shape of diminishing cross sectional dimension. The schematical front elevational view of the end-effector 11 on FIG. 7 illustrates the adaptability of the two arms 53 and 55 to such a preform. Two degrees of articulation in the arms 53 and 55 of the second gripper means 23 allow arm 55 to contact the preform at 117 while permitting arm 53 to continue its closing motion until it contacts the preform at 119. With reference to both FIGS. 3 and 7 it is appreciated that the spherical bearings 61 and 67 provide this added degree of articulation needed to accommodate irregular shapes.

With the preform thus acquired by the end-effector of this invention, the industrial manipulator with which the end-effector is associated can transport the preform from a first work station to a second work station. What has been described is an end-effector which adapts itself automatically to the orientation of a preform or the like. The linkage in the end-effector allows the end-effector to adapt itself to the existing orientation of an object as well to grasp a wide variety of irrregular twisted shapes. While the present invention has been described in combination with an industrial manipulator for use in a manufacturing process, the present invention is useful in any environment in which automation is applicable.

We claim:

1. An end-effector comprising:
   a structural frame means having at one end thereof mounting means for establishing an interface with an industrial manipulator and a first fixed axis proximate the other end thereof;
   first gripper means rotatable about said first fixed axis;
   second gripper means rotatable about said first fixed axis;
   single actuating means for effecting the rotational movement of said first and second gripper means about said first fixed axis relative to each other; and
   brake means operably associated with said first gripper means for positively locking said first gripper means in a fixed position relative to said first fixed axis, such that said single actuating means now effects the rotational movement of said second gripper means about said first fixed axis and relative to said locked first gripper means.

2. The end effector according to claim 1 wherein the actuating means is mounted on the structural frame means by means of a second fixed axis, said actuating means being rotatable about said axis and wherein said actuating means is operably associated with the first and second gripper means by means of a floating axis, whereby said first and second gripper means are rotatable about the first fixed axis relative to said structural frame member such that said first and second gripper means can be oriented with an object independent of the overall end-effector orientation relative to the object.

3. The end-effector according to claim 2 wherein the first gripper means includes a pair of spaced arms rotatable about the first fixed axis.

4. The end-effector according to claim 3 wherein the brake means is operably associated with the first and second arms of the first gripper means, said arms being lockable in a fixed relation relative to each other and the structured frame member upon the application of said brake means.

5. The end-effector according to claim 4 wherein the second gripper means includes a first and a second arm pivotably mounted about the first fixed axis for independent movement thereabout relative to each other.

6. The end-effector according to claim 5 wherein the first and second arms of the second gripper means are connected by a shaft means mounted in each of said arms by means of spherical bearings, said shaft means being operably associated with the actuating means by a link pivotably connected to the first floating axis and connected to the shaft means to define a second floating axis, each of said arms being movable with respect thereto such that said arms can engage an object of irregular shape.

7. The end-effector according to claim 4 wherein the brake means is operably associated with the first and the second arms of the first gripper means by an elongated rod movably supported by the structural frame means, said rod being axially and vertically movable as the first gripper means pivots about the first fixed axis.

8. The end-effector according to claim 7 wherein the brake means includes a disk brake means.

9. An end-effector comprising:
   a structural frame means having at one end thereof mounting means for establishing an interface with an industrial manipulator and a first fixed axis proximate the other end thereof;
   first gripper means rotatable about said first fixed axis;
   second gripper means including a first and a second arm pivotably mounted about said first fixed axis for independent movement thereabout relative to each other, said first and second arms of said second gripper means being connected by a shaft means mounted in each of said arms by means of spherical bearings, said shaft means being operably associated with the actuating means by a link pivotably connected to said first floating axis and connected to said shaft means to define a second floating axis, each of said arms being movable with respect thereto such that said arms can engage an object of irregular shape;

single actuating means for effecting the rotational movement of said first and second gripper means about said first fixed axis relative to each other; and brake means operably associated with said first gripper means for positively locking said first gripper means with respect to said first fixed axis, such that said single actuating means now effects the rotational movement of said second gripper means about said first fixed axis and relative to said restricted first gripper means.

10. An end-effector comprising:

a structural frame means having at one end thereof mounting means for establishing an interface with an industrial manipulator and a first fixed axis proximate the other end thereof;

first gripper means rotatable about said first fixed axis;

second gripper means rotatable about said first fixed axis;

single actuating means mounted on said structural frame means by means of a second fixed axis, said single actuating means being rotatable about said second fixed axis and operably associated with the first and second gripper means by means of a floating axis, whereby said first and second gripper means are rotatable about the first fixed axis relative to said structural frame member such that said first and second gripper means can be oriented with an object independent of the overall end-effector orientation relative to the object; and brake means operably associated with said first gripper means for positively locking said first gripper means in a fixed position relative to said first axis, such that said actuating means now effects the rotational movement of said second gripper means about said first fixed axis and relative to said restricted first gripper means.

11. An end-effector comprising:

a structural frame means having one end thereof mounting means for establishing an interface with an industrial manipulator and a first fixed axis proximate the other end thereof;

first gripper means including a pair of spaced apart arms rotatable about said first fixed axis;

second gripper means rotatable about said first fixed axis;

actuating means for effecting the rotational movement of said first and second gripper means about said first fixed axis relative to each other, said actuating means being mounted on the structural frame by means of a second fixed axis, said actuating means being rotatable about said second fixed axis and wherein said actuating means is operably associated with the first and second gripper means by means of a floating axis, whereby said first and second gripper means are rotatable about the first fixed axis relative to said structural frame member such that the first and second gripper means can be oriented with an object independent of the overall end-effector orientation relative to the object; and brake means including a disc brake means, operably associated with said pair of spaced apart arms of said first gripper means by an elongated rod movably supported by the structural frame means, said rod being axially and vertically movable as the first gripper means pivots about the first fixed axis for restricting the rotational movement of said first gripper means, such that said actuating means now effects the rotational movement of said second gripper means about said first fixed axis and relative to said restricted first gripper means.

12. The end-effector according to claim 11 wherein the second gripper means includes a first and a second arm pivotably mounted about the first fixed axis for independent movement thereabout relative to each other.

13. The end-effector according to claim 12 wherein the first and second arms of the second gripper means are connected by a shaft means mounted in each of said arms by means of spherical bearings, said shaft means being operably associated with the actuating means by a link pivotably connected to the first floating axis and connected to the shaft means to define a second floating axis, each of said arms being movable with respect thereto such that said arms can engage an object of irregular shape.

* * * * *